Figure 1:
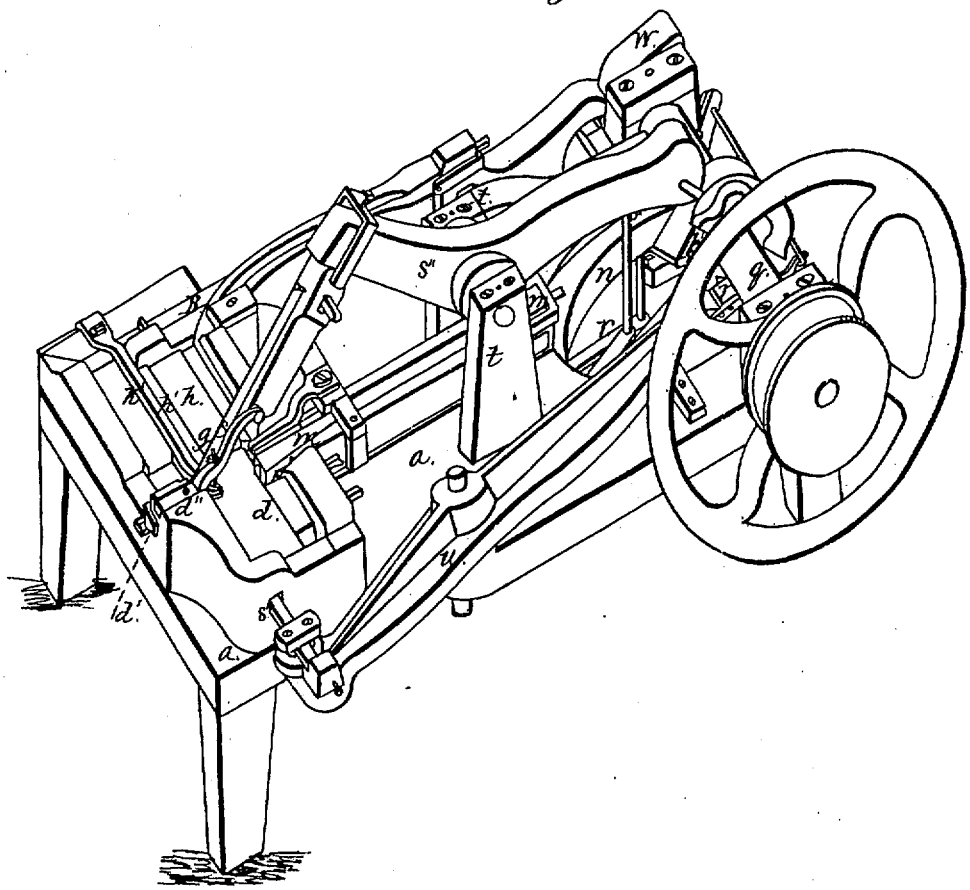

2 Sheets—Sheet 1.

E. HUNT & W. OSGOOD.

MACHINE FOR MAKING WROUGHT IRON SPIKES OR NAILS.

RX No. 78. Reissued Jan. 15, 1846.

8079X RELATED DOC

E. HUNT & W. OSGOOD.
MACHINE FOR MAKING WROUGHT IRON SPIKES OR NAILS.
Rx No. 78. Reissued Jan. 15, 1846.
8079x RELATED DOC
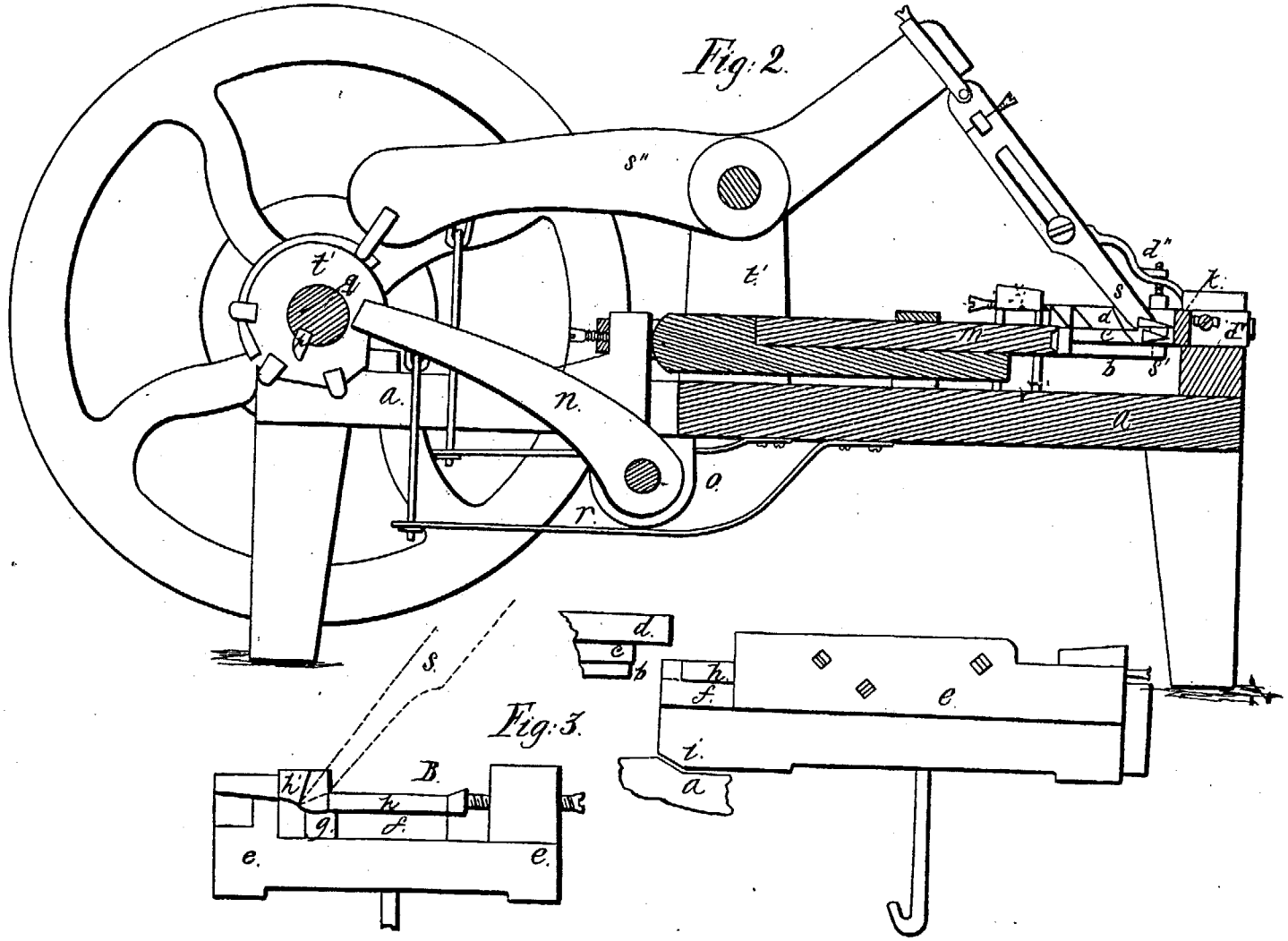

UNITED STATES PATENT OFFICE.

Rx 78

ERASTUS CORNING AND JAMES HORNER, OF ALBANY, ASSIGNEES OF WILLIAM OSGOOD AND EBENEZER HUNT, OF TROY, NEW YORK.

IMPROVEMENT IN MACHINES FOR MAKING WROUGHT-IRON SPIKES AND NAILS.

8079X RELATED DOC

Specification forming part of Letters Patent dated March 14, 1834; Reissue No. 78, dated January 15, 1846.

*To all whom it may concern:*

Be it known that WILLIAM OSGOOD and EBENEZER HUNT, both of Troy, in the county of Rensselaer and State of New York, did invent a Machine for Making Wrought Nails and Spikes, a true and accurate description of which is as follows, reference being had to the accompanying drawings, which form a part of the same—

Figure 1 being an isometrical view; Fig. 2, a central section between the die-boxes. Fig. 3^A is a side elevation of the die-box; Fig. 3^B, elevation of the working end of the movable die-box.

The nails are to be manufactured from rods either rolled or slit, but rolled rods are preferable, and the size of the rod must correspond with the size of the body of the nail. The points of the nails may be either flat or sharp; but flat points are made most advantageously by our machine. The nail-rod is put into the machine hot, and the piece to form the nail is cut off and gripped, and immediately after is pointed and headed both at the same time.

The form of this machine may be so varied in its details that no description can be given which will comprehend all the varieties of which it is susceptible; but it is the modes of operation which form the ground-work of this invention, which several operations are as follows: first, cutting off the piece of rod for the nail and gripping it; second, the hammering, and thereby forming the point; third, the heading, which two last are performed, as above stated, nearly at the same time; fourth, the disengaging the nail and opening the grip to receive the rod for the next nail or spike.

The foundation or bed-plate of this machine is a flat strong plate or frame of cast-iron, *a*, of such shape and with such upward and downward projections as to accommodate the operating parts hereinafter to be specified. This is shown in Fig. 5.

The apparatus for performing the first operation—viz., cutting off and gripping—consists of two compound blocks, one of which is fixed and the other movable. These are composed of several parts, hereinafter described.

The fixed or stationary block for assisting to grip the rod (see Fig. 2) is attached to the frame at one end thereof, and may consist of these plates placed horizontally one upon the other. The two lower plates are of a width exactly equal to the length of the body of the nail. The thickness of the bottom one, *b*, is unessential—say from three-fourths of an inch to an inch and a half. The middle plate, *c*, must exactly correspond in thickness with the size of the body of the nail, and must be of steel, or of wrought-iron with steel on the inner end, or of some other substance equally hard. The inner end of this middle plate forms one side of the cavity in which the nail is held for heading and pointing. The third or top plate, *d*, of the fixed block is wider and longer than the other two, and the end of it projects over the others and forms the upper side of the square cavity in which the nail is gripped. A cross-view of this die is shown in Fig. 3, with the movable die open or drawn back from it. Here the spike is shown in red lines.

There is a movable or sliding block, *e*, which we denominate the "die-box," composed of a piece of cast-iron consisting of three sides of a square with a bottom, which bottom is a little (say one-fourth of an inch) lower than the bottom of the bottom plate of the fixed block above named. The cavity of the sliding block or die-box *e* is occupied by two plates, the bottom one of which is also in two pieces, which are not fastened together, but are placed side by side. The width of the widest piece, *f*, Fig. 3^B, corresponds with the length of the body of the nail and that of the narrowest piece, *g*, with the taper or point of the nail, which is about one-third of the width of the widest piece. The widest of these pieces, *f*, projecting under the middle plate of the stationary block and fitting closely to it, forms the body of the cavity, which grips the body of the nail, and the narrow piece, *g*, also projecting under, forms the bed on which the point of the nail is formed, and the top of this last-mentioned piece is shaped by grinding or otherwise, so as to form the die or angle of the point of the nail or spike. (See elevation A in Fig. 3.) The length of the plates is at right angles to the position of the nail. On the compound plate *f g* last specified lies another plate, *h*, of the same width as the plate *f* under it, and is about an inch (more or less) in thickness; but the inner end—say about one inch of its length— is reduced to the exact thickness of the middle plate, *c*, of the stationary block opposite; and when the die-box *e* is forced upward and the bed-plate *f* passes under the opposite middle plate, *c*, the thin end of the plate *h* last specified forms three sides of the cavity or chamber in which the nail is gripped, and the third or top plate, *d*, of the fixed block forms the upper or fourth side of the grip.

As the die-box is forced inward to grip the nail the forward end of it is raised just before it stops by little inclined planes *i* on each side of the die-box, fixed in the frame, up which the die-box slides in order to grip the nail on each of its four sides.

On the front end of the main bed-plate *a* is the cutter-block *k*, made fast at the outer end to said bed-plate in a place made to receive it, and it is made secure by a dovetail wedge. The inner or operating end of said cutter-block *k* is exactly where the rod is cut off at the point of the nail, which is effected by the movable die passing said cutter in gripping the nail.

When the rod is thrust in to form the nail, the farther end, which is to form the head, strikes against a spring-gage, *l*, the opposite end of which is fastened to the bed-plate, and the cutter *k'*, which is attached to it and moves with the die-box, coming up against the cutter-block *k*, the piece which is to form the nail is thereby cut off and gripped by the moving up of the die-box, and is ready to form the head and point. When the nail is cut off, it is carried forward by the die-box until the back end, which is to form the head, passes by and is clear of the gage-spring *l*, above mentioned, and the front end, which is to make the point, is just passed, but even with the back edge of the cutter-block *k*; at this instant commences the operation of heading and pointing.

The header is a solid bar of cast or wrought iron or other proper substance, *m*—say from eighteen inches to two feet in length and from three to four inches square—lying horizontally and lengthwise of the machine in proper sliding ways, so that the header-die, which is inserted in the forward end of the header, may be exactly opposite the projecting end of the rod which is to form the head of the nail. A strong lever, *n*, of cast or wrought iron, bent nearly at right angles, with one end or arm longer than the other, is so placed that the short arm, which at its end forms the fulcrum, is connected by a strong movable or articulating joint to two downward projections, *o*, from the under side of the bed-plate, and the other or longer end of said lever rests upon a cam, *p*, on the main shaft *q*, which lies across the back end of said plate or frame, while the angular point or elbow stands against the back end of the header, and the end of said lever being raised by said cam, the header, with its die, is forced forward and forms the head of the nail, and when so formed the head is carried back by a spring, *r*. That part of the heading-die which comes in contact with the end of the spike-rod may be so shaped as to give any required form to the head of the spike.

The point is formed by two hammers, *s s'*, each hammer being operated by a lever each, *s''* and *u*, in the following manner: The top hammer stands in an angle with the nail of about forty-five degrees, retained therein by the guide *d''*, in combination with guides *d* and *d'*, as hereinafter described, so that when it strikes the nail the stroke corresponds with the extension of the nail forward. The upper end of this hammer is connected by a knee joined to a strong lever, *s''*, which lever rests at about one-third of its length on two fulcrum-posts, *t*, strongly attached to the bed-plate *a*, and the opposite or longest end of which lever rests on the periphery of a wheel, *t'*, with four (more or less) cams or projections on its edge, which gives as many successive strokes to the point of the nail; and the periphery of this cam-wheel is so adjusted as to advance the hammer a little at each successive strokes as the point of the nail diminishes. The lower end of this hammer, or that part which comes in contact with the bar to form the point of the nail, is guided by passing down through a space cut out of the upper die, *d*, for that purpose, and bearing against a guide, *d'*, fastened in front of it to the frame, it being regulated laterally by another guide, *d''*, that bears against its side, and is also fastened to the frame, as clearly represented in the drawings. The side hammer, *s'*, when used, lies horizontally in such a situation as to strike against the side of the point of the nail, but strikes it at right angles with the nail, and the lever *u*, which operates it, lies on the bed-plate *a*, and has for its fulcrum a pin standing on the same, and receives its motion from side cams or undulations on the side of a cam-wheel, *t'*, last above specified.

The die-box or sliding block *e*, above specified, is advanced inward to grip the nail by a wedge, *v*, operating horizontally behind the outer end of said die-box, which wedge is driven forward by a cam, *w*, on the end of the main shaft, in shape nearly semicircular, and so adjusted as to perform its operations in about half the time of each revolution, leaving the grip open half of the time, to reenter the rod for the next nail. The die-box, like the header, is carried back by a spring. As the die-box comes back and the grip is opened the above-mentioned gage-spring serves, when necessary, to disengage the nail, and in case it should fail it may be aided by a hook, which is attached to the die-box, and, drawing back with it against the head of the nail, disengages it, if not done before.

We have sometimes used, especially in making square-pointed nails, what we term a "forcing-slide," which is a small instrument operating by the side of the cutter-block in such manner that when the piece for the nail is cut off this forcing-slide, operating by levers and a proper cam, &c., forces the piece back so as to leave room for the point to remain clear of the cutter-block, and when this is used the gage-spring may be dispensed with; but this is not material.

All the operating parts of the griping, heading, and cutting apparatus which require it are to be made of or faced with steel and suitably hardened.

What we claim as the invention of the said WILLIAM OSGOOD and EBENEZER HUNT, and desire to secure by the reissue of these Letters Patent, is—

1. The combination of the dies, constructed substantially as herein described, with the united heading and pointing apparatus, so as to grip the rod on four sides nearly its whole length while heading and pointing, by giving the movable die a compound motion upward and forward, all as above specified.

2. The combination of the pointing-hammers, operating by progressive cams and directed by the guides *d d′ d″*, for pointing the nails, with the supplemental plate *g* in the sliding die-box, to form one side of the point, constructed and arranged substantially in the manner and for the purpose herein set forth.

ERASTUS CORNING.
JAMES HORNER.

Witnesses:
IRWIN B. DAVIDSON,
H. W. TURNER.